(12) United States Patent
Shimura et al.

(10) Patent No.: US 7,843,091 B2
(45) Date of Patent: Nov. 30, 2010

(54) POSITIONING STRUCTURE BETWEEN PARTS OF DIFFERENT MATERIALS AND ASSEMBLY STRUCTURE OF MOTOR

(75) Inventors: Ayako Shimura, Kiryu (JP); Junji Rokunohe, Kiryu (JP); Naoyuki Kanamori, Kiryu (JP)

(73) Assignee: Nidec Servo Corporation, Kiryu-shi (JP)

( * ) Notice: Subject to any disclaimer, the term of this patent is extended or adjusted under 35 U.S.C. 154(b) by 660 days.

(21) Appl. No.: 11/459,504

(22) Filed: Jul. 24, 2006

(65) Prior Publication Data
US 2007/0022597 A1    Feb. 1, 2007

(30) Foreign Application Priority Data
Jul. 28, 2005   (JP)   ............... 2005-218870

(51) Int. Cl.
*H02K 15/12* (2006.01)
(52) U.S. Cl. .......................................... 310/43; 310/89
(58) Field of Classification Search ................... 310/43, 310/89
See application file for complete search history.

(56) References Cited

U.S. PATENT DOCUMENTS

| | | | | |
|---|---|---|---|---|
| 5,757,108 A * | 5/1998 | Suzuki | ...... | 310/49 R |
| 6,114,785 A * | 9/2000 | Horng | ...... | 310/68 B |
| 6,400,051 B1 * | 6/2002 | Hsieh | ...... | 310/89 |
| 6,756,718 B2 * | 6/2004 | Lee | ...... | 310/254 |
| 6,809,457 B1 * | 10/2004 | Horng et al. | ...... | 310/267 |

FOREIGN PATENT DOCUMENTS

| | | | |
|---|---|---|---|
| CN | 2664268 Y | | 12/2004 |
| JP | 61073535 A | * | 4/1986 |
| JP | 09-285060 | | 10/1997 |
| JP | 2002-218720 | | 8/2002 |
| JP | 2004289934 A | * | 10/2004 |

OTHER PUBLICATIONS

US English translation of JP 61073535 A, Doi et al, Molded Motor, Apr. 1986, All pages pertinent.*

* cited by examiner

*Primary Examiner*—Quyen Leung
*Assistant Examiner*—Naishadh N Desai
(74) *Attorney, Agent, or Firm*—Oblon, Spivak, McClelland, Maier & Neustadt, L.L.P.

(57) ABSTRACT

A first part formed of a first material is positioned to a second part formed of a second material, which is different from the first material in degree of modification due to environmental variation, by contacting surfaces of the first and second parts. At least three projections are formed on the contact surface of the first part along a circle whose center is coincident with a reference point. Grooves are formed on the contact surface of the second part so that the respective projections are fitted therein and that have wall surfaces to which the projections can contact at the inner and outer sides of the projections. The width of the grooves is determined so that the projections contact the inner or outer wall surface of the grooves even when the first and second parts deform in different degrees due to environmental variation.

6 Claims, 8 Drawing Sheets

Figure 1:
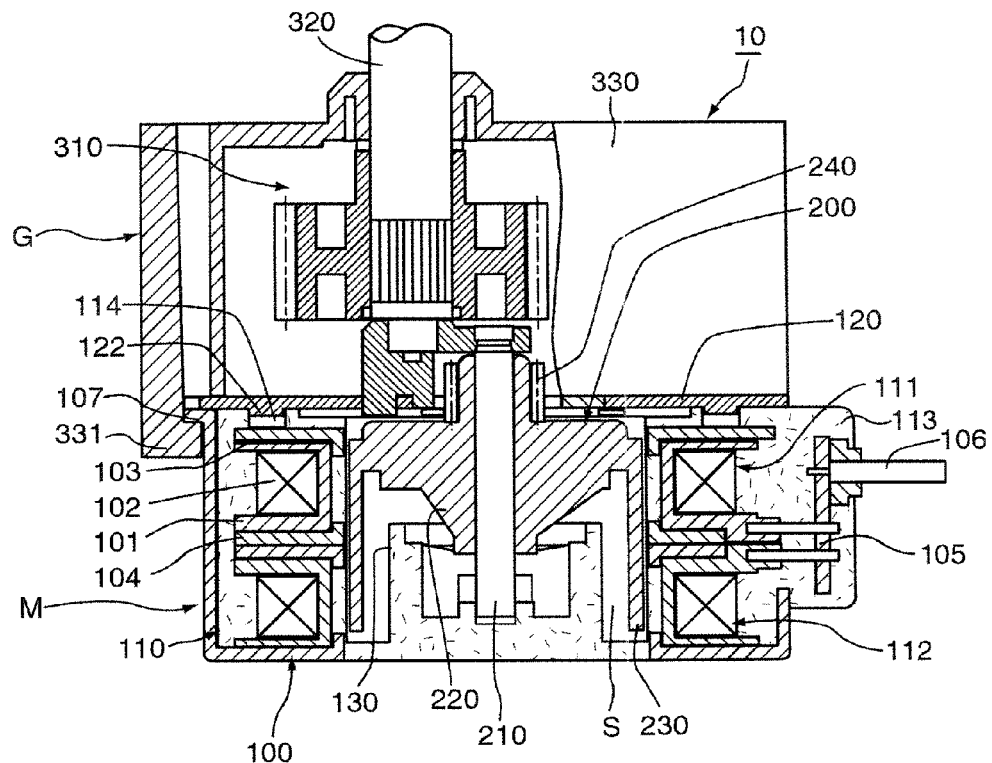

PRIOR ART
FIG. 10A
PRIOR ART
FIG. 10B
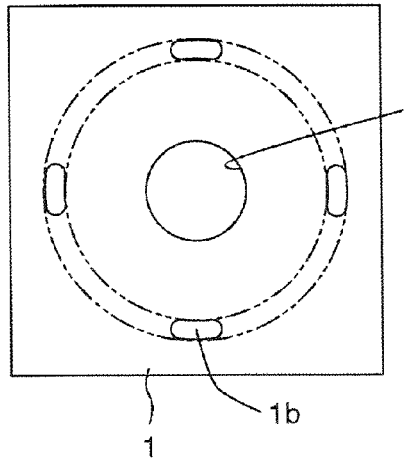
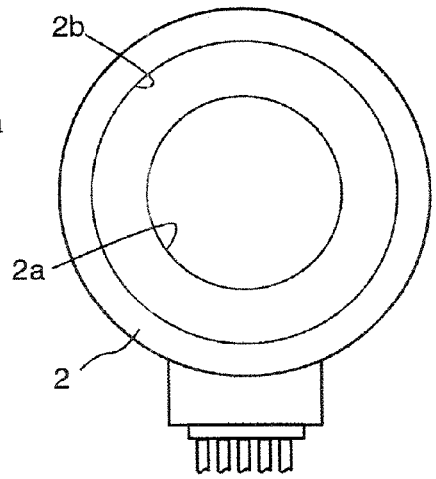
PRIOR ART
FIG. 11
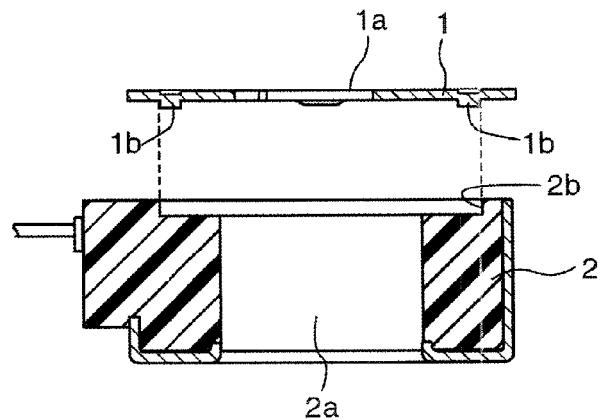
PRIOR ART
FIG. 12
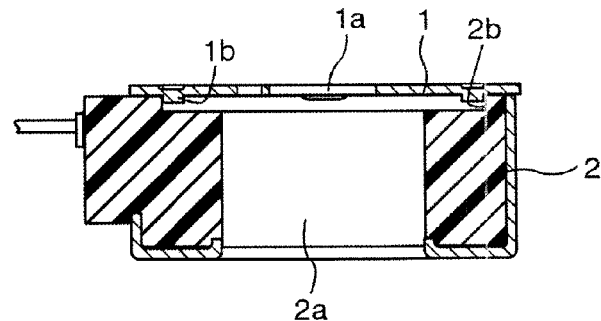

US 7,843,091 B2

POSITIONING STRUCTURE BETWEEN PARTS OF DIFFERENT MATERIALS AND ASSEMBLY STRUCTURE OF MOTOR

BACKGROUND OF THE INVENTION

The present invention relates to a positioning structure between different materials such as resin and metal that are different in degree of modification due to environmental variation. The present invention further relates to a motor assembly structure that uses the positioning structure.

A mold motor, whose stator is molded of resin, has been previously used in order to improve chemical resistance and insulation. A mold motor is disclosed in Japanese unexamined patent publication JP2002-218720A, for example.

In one type of mold motors, a metal front cover is fixed to a resin-molded stator assembly, and a rotor is rotatably supported by bearings mounted to the front cover.

FIG. 10A, FIG. 10B, FIG. 11 and FIG. 12 show a conventional example of an assembly structure of such a mold motor. FIG. 10A is a plan view of a metal front cover, FIG. 10B is a plan view of a resin-molded stator assembly, FIG. 11 is a sectional view of the front cover and the stator assembly before attaching the front cover to the stator assembly and FIG. 12 is a sectional view of the stator assembly to which the front cover is attached. FIGS. 11 and 12 omit showing parts included in the stator assembly, such as coils and claw poles, and show the whole as a resin member.

As shown in FIGS. 10A and 11, a center hole 1a is formed at the center of the front cover 1. A bearing (not shown) that supports a rotation shaft will be provided inside the center hole 1a. Four projections 1b are formed along a circle that is concentric with the center hole 1a at equal angular intervals. On the other hand, a stator assembly 2 is constructed by cascading a plurality of unit stators (not shown) that are molded of resin. Each of the unit stators consists of a coil wound around a bobbin and a pair of claw poles that sandwich the bobbin. As shown in FIGS. 10B and 11, a rotor housing 2a is formed in the center of the stator assembly 2 to hold a rotor, and an upper surface to which the front cover 1 is attached is formed so that the center area is dented by one step with respect to the circumference to form a step 2b along the boundary.

The inside diameter of the step 2b is determined to be nearly equal to a diameter of the circumscribed circle of the projections 1b. As shown in FIGS. 11 and 12, when the projections 1b are fitted inside the step 2b, the front cover 1 can be positioned to the stator assembly 2 so that the center of the center hole 1a of the front cover 1 is coincident with the center of the rotor housing 2a of the stator assembly 2.

However, the conventional positioning structure of a motor has a problem that environmental variation, such as temperature variation and humidity variation, changes the relative positional relationship between the front cover 1 and the stator assembly 2. When the change of the relative positional relationship becomes large, the rotor supported by the front cover 1 is decentered and contacts the stator assembly, which disables the rotation of the motor.

Figure 13A:
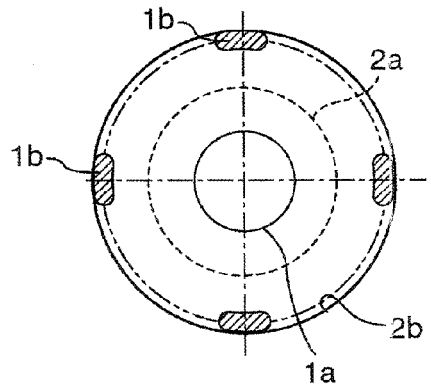
Figure 13B:
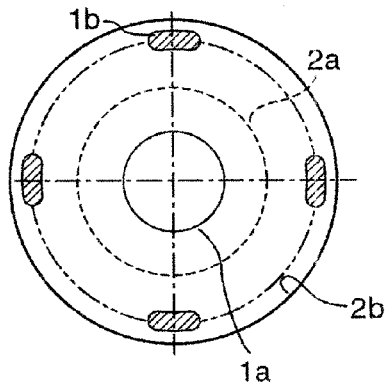
Figure 13C:
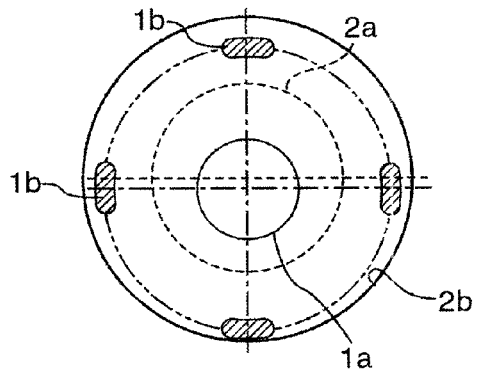
Figure 14A:
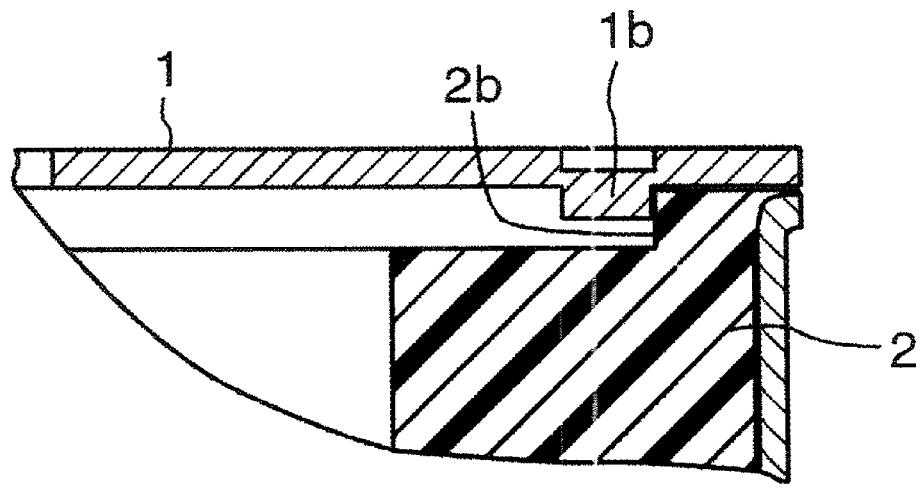
Figure 14B:
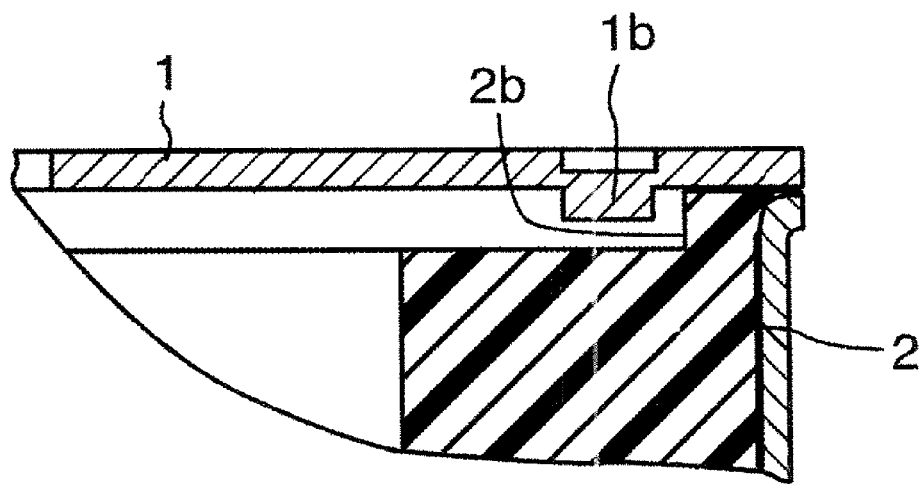

This problem will be described using FIGS. 13A through 13C, 14A and 14B. FIGS. 13A through 13C are plan views showing positional relationships of the front cover 1, which has the center hole 1a and the projections 1b, with respect to the stator assembly 2, which has the rotor housing 2a and the step 2b, FIGS. 14A and 14B are sectional views thereof. That is, according to the conventional positioning structure of a motor, the four projections are inscribed in the step 2b in normal temperature as shown in FIGS. 13A and 14A, which positions the front cover 1 to the stator assembly 2 so that the center hole 1a and the rotor housing 2a are concentric. Since expansion of the resin part of stator assembly 2 is larger than that of the metal front cover 1, the increase in temperature causes a gap between the projections 1b and the step 2b as shown in FIGS. 13B and 14B, which disenables the positioning function. Therefore, if an external force in a radial direction is added under this condition, the front cover 1 will be displaced with respect to the stator assembly 2 as shown in FIG. 13C, which decenters the rotor supported by the front cover through the rotation shaft with respect to the rotor housing 2a of the stator assembly 2. As a result, the rotor may contact the stator assembly 2 and rotation may become impossible.

Further, since the resin part deforms easily than the metal part due to not only temperature variation and humidity variation but also an effect of external force, the same fault as the above may be caused by such environmental variation. Still further, the problem of aggravation of the positioning accuracy due to environmental variation is caused in not only the motor but also a composition that combines parts of different materials.

SUMMARY OF THE INVENTION

The present invention is accomplished in view of the problem in the prior art and a first object thereof is to provide a positioning structure between parts of different materials, which is capable of reducing a change of relative position of parts formed of different materials that are different in degree of modification due to environmental variation after the parts are positioned.

A second object of the present invention is to provide an assembly structure of a motor, which is capable of keeping a rotation shaft from decentering due to environmental variation after positioning, when a metal cover part is positioned to a resin stator assembly.

A third object of the present invention is to provide a positioning structure between small parts of different materials, for example, between a gear and a rotation shaft.

In order to accomplish the above-mentioned first object, a positioning structure between parts of different materials according to a first aspect that positions a first part formed of a first material to a second part formed of a second material, which is different from the first material in degree of modification due to environmental variation, by contacting surfaces of the first and second parts, includes; at least three projections that are formed on the contact surface of the first part at nearly equal angular intervals along a circle whose center is coincident with a reference point, which is defined as a point where the relative position between the first and second parts does not change even if environment varies, and grooves that are formed on the contact surface of the second part so that the respective projections are fitted therein and that have wall surfaces to which the projections can contact at the inner and outer sides of the projections when viewed from the reference point. The width of the grooves is determined so that the projections contact the inner or outer wall surface of the grooves even when the first and second parts deform in different degrees due to environmental variation. The first and second parts are positioned by contacting the surfaces thereof while fitting the projections into the grooves.

According to the above-mentioned positioning structure between parts of different materials, since the projections are fitted in the grooves that have the inner and outer wall surfaces when viewed from the reference point, the projections contact the inner wall surface or the outer wall surface even when the first and second parts deform in different degrees due to environmental variation. Since the projections are formed along the circle whose center is coincident with the reference point, the positional relationship between the first and second parts at the reference point can be maintained regardless of the environmental variation without adding special parts for the positioning.

Metal and resin can be used as the combination of the materials of the first and second parts. In this case, it is preferable that the first part on which the projections are formed is made of metal and that the second part on which the grooves are formed is made of resin.

According to this construction, the positional relationship between the first and second parts at the reference point can be maintained in a combination of resin, which has a large degree of deformation due to environmental variation, and metal, which has a small degree of deformation due to environmental variation, that are generally used in industry. Metal is suitable for keeping high accuracy of dimension, while it is not suitable for forming a complicated shape. On the other hand, resin is suitable for forming a complicated shape. Therefore, when the first part with the projections having simple structure is made of metal and the second part with the grooves is made of resin as described above, the positioning structure can be provided with reducing burden in manufacture.

Further, when the above-mentioned positioning structure is applied to a motor, it is preferable that the first part is a cover member for supporting a rotation shaft of the motor and that the second part is a stator assembly that constitutes a stator of the motor. In this case, it is preferable that the rotation center of a rotor, that is, the center of the rotation axis is the reference point.

With this construction, since the center of the rotation axis is the reference point, the decentering of the rotor with respect to the stator assembly can be reduced even if the environment varies, which can provide a motor with wide scope of application that can be used under the large environmental variation.

In order to accomplish the above-mentioned second object, an assembly structure of a motor according to the second aspect of the present invention that positions a cover member for supporting a rotation shaft of the motor to a stator assembly that constitutes a stator of the motor, by contacting surfaces thereof, includes: at least three projections that are formed on the contact surface of the metal-made cover member at nearly equal angular intervals along a circle whose center is coincident with a reference point that is defined as the center of the rotation shaft, and grooves that are formed on the resin-made contact surface of the stator assembly so that the respective projections are fitted therein and that have wall surfaces to which the projections can contact at the inner and outer sides of the projections when viewed from the reference point. The width of the grooves is determined so that the projections contact the inner or outer wall surface of the grooves even when the cover member and the stator assembly deform indifferent degrees due to environmental variation. The cover member and the stator assembly are positioned by contacting the surfaces thereof while fitting the projections into the grooves.

With this construction, since the center of the rotation axis is the reference point, the decentering of the rotor with respect to the stator assembly can be reduced even if the environment varies, which can provide a motor with wide scope of application that can be used under the large environmental variation.

In order to accomplish the above-mentioned third object, a positioning structure between parts of different materials according to a third aspect that positions a first part formed of a first material to a second part formed of a second material, which is different from the first material in degree of modification due to environmental variation, by inserting the second part into the first part, includes; a cylindrical projection that is formed on the first part along a circle whose center is coincident with a reference point that is defined so as not to change the relative position between the first and second parts even if environment varies, and a groove that is formed on the second part so that the projection is fitted therein and that has wall surfaces to which the projection can contact at the inner and outer sides of the groove when viewed from the reference point. The width of the groove is determined so that the projection contact the inner or outer wall surface of the grooves even when the first and second parts deform in different degrees due to environmental variation. The first and second parts are positioned while fitting the projection into the groove.

With this construction, in the positioning structure between smaller parts, since the positional relationship between two parts is not affected by environmental variation, the displacement of the two parts at the reference point can be avoided.

For example, the above-described positioning structure is effective on the case where the first part is a metal-made hollow pipe and the second part is a resin-made gear. In this case, when the tip of the hollow pipe is inserted into the groove formed on the gear to position to each other, the hollow pipe can be fixed to the gear with avoiding the displacement therebetween.

DESCRIPTION OF THE ACCOMPANYING DRAWINGS

Figure 2A:
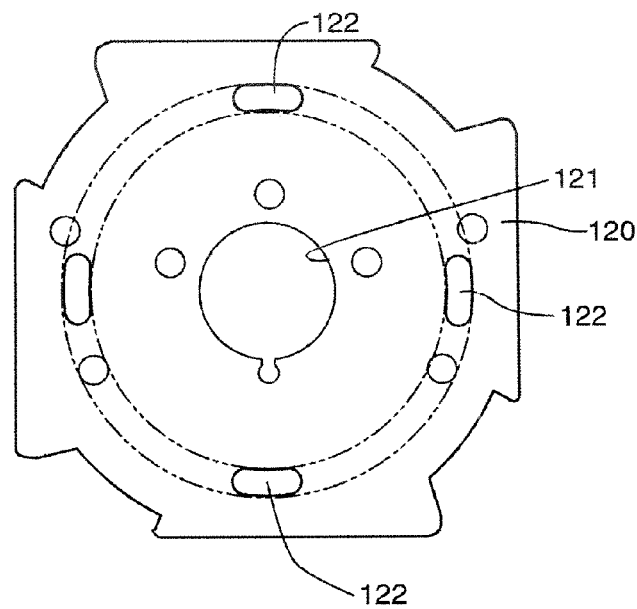
Figure 2B:
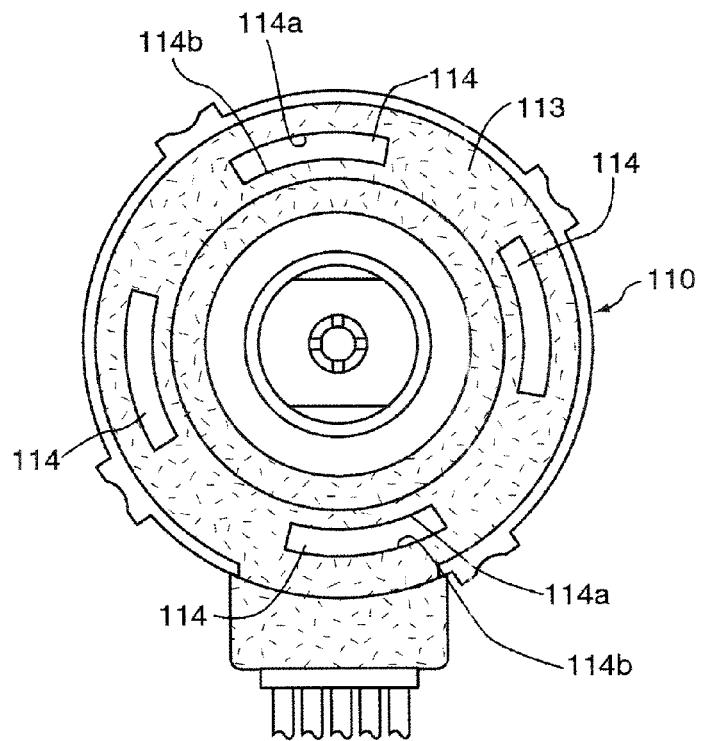
Figure 3A:
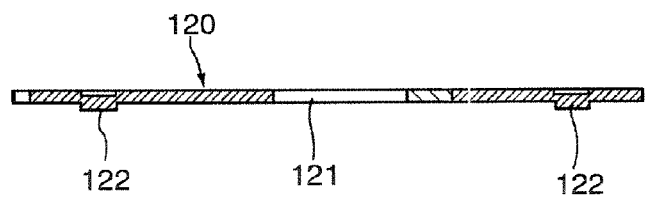
Figure 3B:
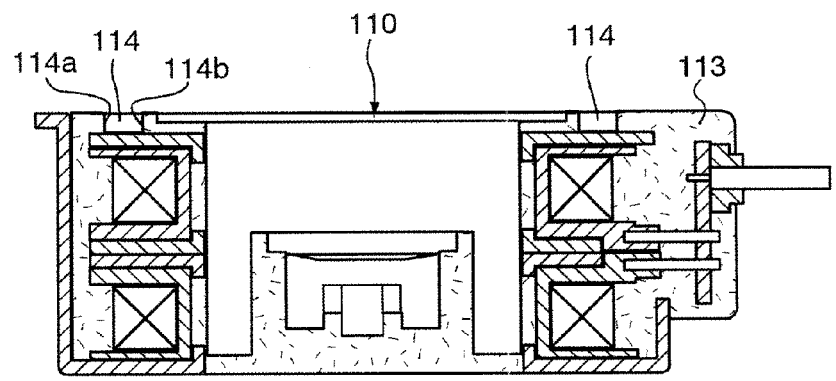
Figure 4A:
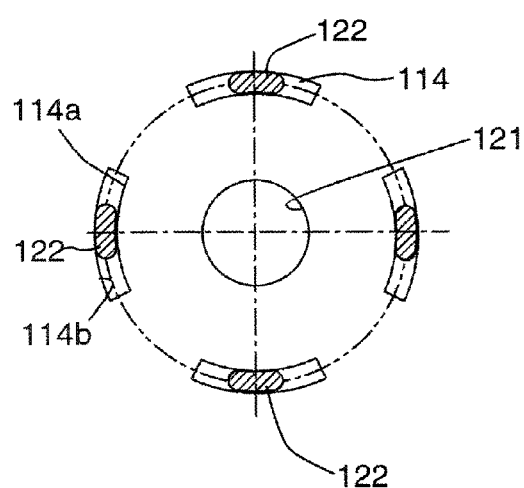
Figure 4B:
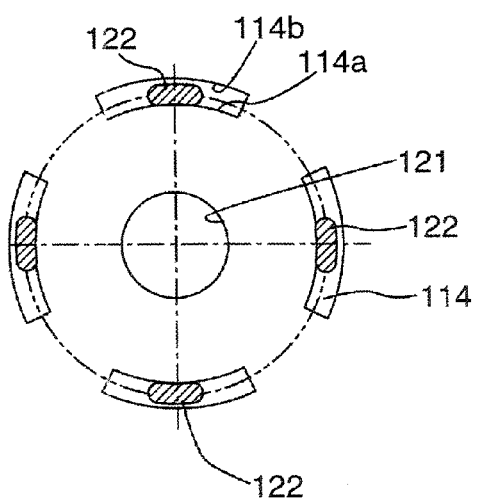
Figure 5A:
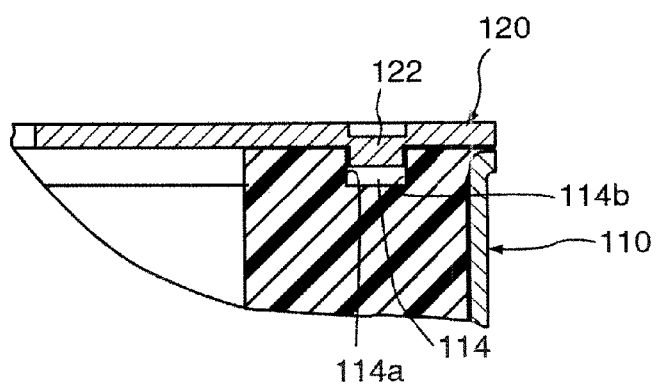
Figure 5B:
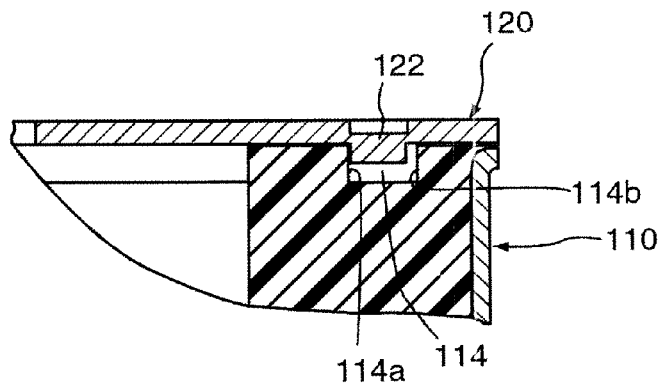
Figure 6A:
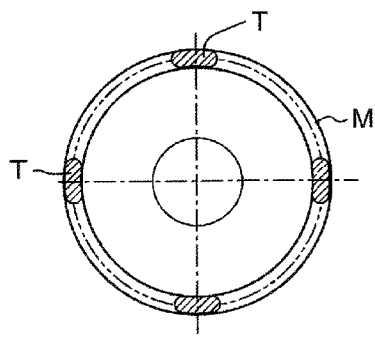
Figure 6B:
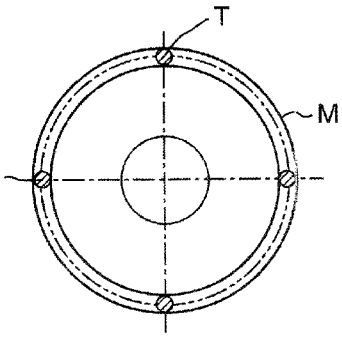
Figure 6C:
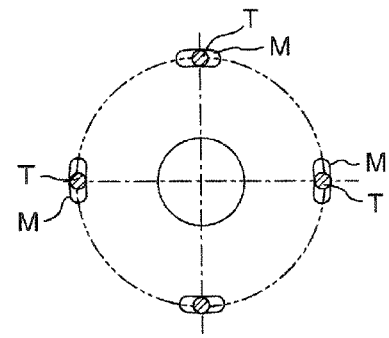
Figure 6D:
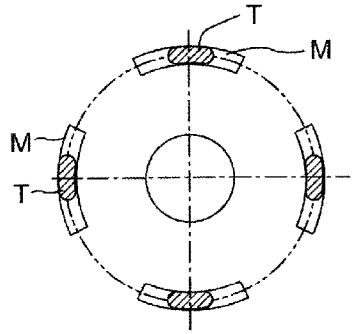
Figure 6E:
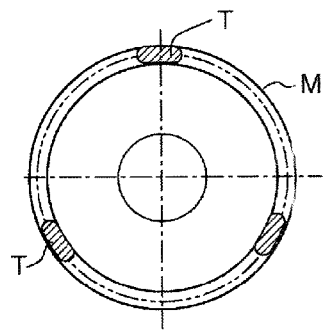
Figure 6F:
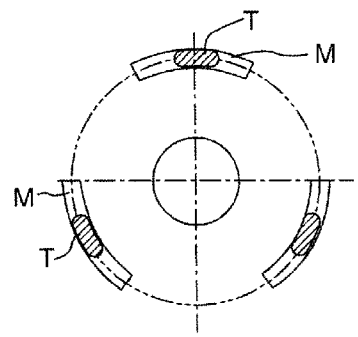
Figure 6G:
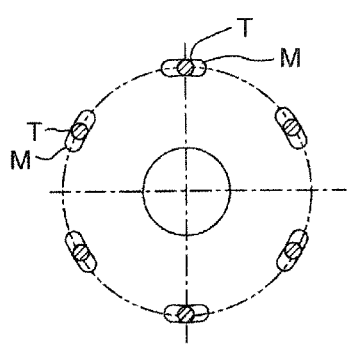
Figure 6H:
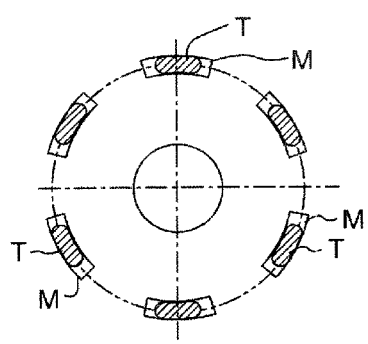
Figure 7A:
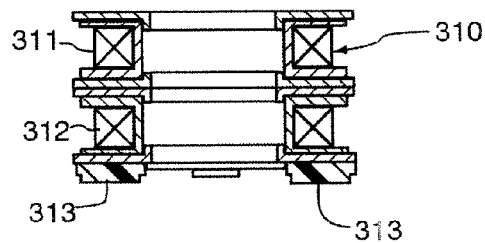
Figure 7B:
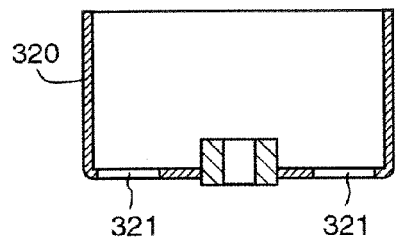
Figure 7C:
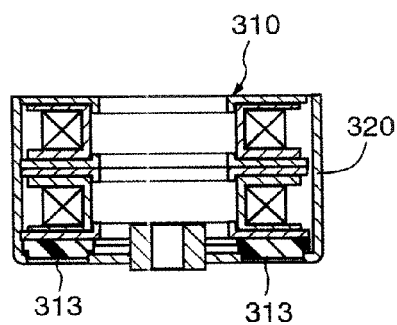
Figure 8A:
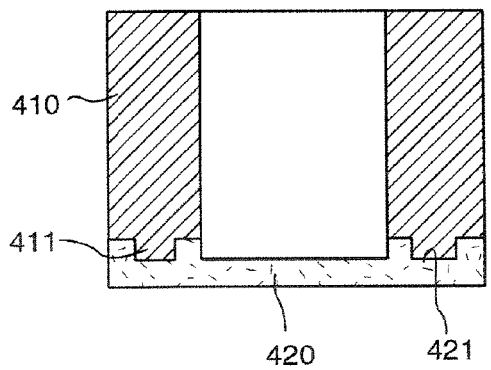
Figure 8B:
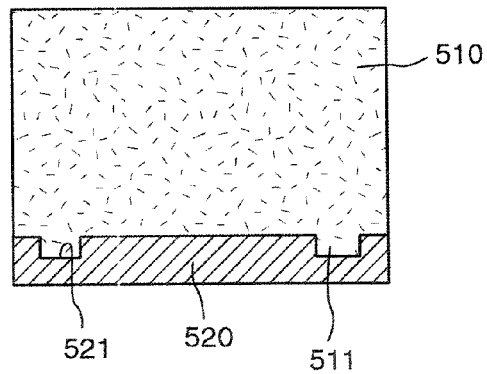
Figure 9:
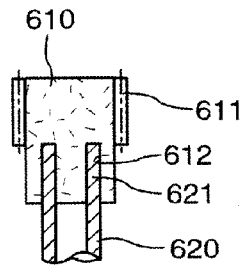

FIG. 1 is a sectional view of a motor to which a motor assembly structure according to a first embodiment 1 of the positioning structure between parts of different materials of the present invention, FIG. 2A is a plan view of a front cover of the motor shown in FIG. 1, FIG. 2B is a plan view of a stator assembly of the motor shown in FIG. 1, FIG. 3A is a sectional view of the front cover of the motor shown in FIG. 1, FIG. 3B is a sectional view of the stator assembly of the motor shown in FIG. 1, FIG. 4A is a plan view showing a relationship between projections of the front cover and a groove of the stator assembly of the motor shown in FIG. 1 at a normal temperature, FIG. 4B is a plan view showing a relationship between the projections of the front cover and the groove of the stator assembly the motor shown in FIG. 1 at an increased temperature, FIG. 5A is a sectional view showing a relationship between projections of the front cover and a step of the stator assembly of the motor shown in FIG. 1 at a normal temperature, FIG. 5B is a sectional view showing a relationship between the projections of the front cover and the step of the stator assembly the motor shown in FIG. 1 at an increased temperature, FIG. 6A is a plan view showing a variation of the relationship between the projections and the groove in the first embodiment, where four oblong projections are formed and a groove is formed along the whole circle, FIG. 6B is a plan view showing a variation of the relationship between the projections and the groove in the first embodiment, where four circular projections are formed and a groove is formed along the whole circle, FIG. 6C is a plan view showing a variation of the relationship between the projections and the grooves in the first embodiment, where four circular projections are formed and grooves are formed at four areas, FIG. 6D is a plan view showing a variation of the relationship between the projections and the grooves in the first embodiment, where four oblong projections are formed and grooves are formed at four areas, FIG. 6E is a plan view showing a variation of the relationship between the projections and the groove in the first embodiment, where three oblong projections are formed and a groove is formed along the whole circle, FIG. 6F is a plan view showing a variation of the relationship between the projections and the grooves in the first embodiment, where three oblong projections are formed and grooves are formed at three areas, FIG. 6G is a plan view showing a variation of the relationship between the projections and the grooves in the first embodiment, where six circular projections are formed and grooves are formed at six areas, FIG. 6H is a plan view showing a variation of the relationship between the projections and the grooves in the first embodiment, where six oblong projections are formed and grooves are formed at six areas, FIG. 7A is a sectional view showing a stator assembly of the motor assembly structure according to a second embodiment of the positioning structure between parts of different materials of the present invention, FIG. 7B is a sectional view showing a casing of the motor assembly structure according to the second embodiment of the positioning structure between parts of different materials of a present invention, FIG. 7C is a sectional view showing the motor assembly structure where the stator assembly and the casing are assembled according to the second embodiment of the positioning structure between parts of different materials of a present invention, FIG. 8A is a sectional view showing one variation of the motor assembly structure of the positioning structure between parts of different materials of the present invention, FIG. 8B is a sectional view showing other one of the modifications of the motor assembly structure concerning the positioning structure between parts of different materials of a present invention, FIG. 9 is a sectional view showing the assembly structure of a mold pinion and a hollow shaft according to a third embodiment of the positioning structure between parts of different materials of the present invention, FIG. 10A is a plan view of a front cover of the conventional motor assembly structure, FIG. 10B is a plan view of a stator assembly of the conventional motor assembly structure, FIG. 11 is a sectional view of the front cover and the stator assembly of the conventional motor assembly structure before attaching the front cover to the stator assembly, FIG. 12 is a sectional view of the stator assembly to which the front cover is attached in the conventional motor assembly structure, FIG. 13A is a plan view showing the relationship between projections of the front cover and a step of the stator assembly of the conventional motor assembly structure at a normal temperature, FIG. 13B is a plan view showing the relationship between the projections of the front cover and the step of the stator assembly of the conventional motor assembly structure at an increased temperature, FIG. 13C is a plan view showing the relationship between the projections of the front cover and the step of the stator assembly after causing displacement in the state of FIG. 13B, FIG. 14A is a sectional view showing the relationship between the projections of the front cover and the step of the stator assembly of the conventional motor assembly at a normal temperature, and FIG. 14B is a sectional view showing the relationship between the projections of the front cover and the step of the stator assembly of the conventional motor assembly at an increased temperature.

DETAILED DESCRIPTION OF THE PREFERRED EMBODIMENTS

Hereafter, embodiments of the positioning structure between parts of different materials according to the present invention will be described with reference to the attached drawings. In the following description, a first embodiment, variations thereof, a second embodiment, and a third embodiment will be described in order. In the first and second embodiments and the variations, the positioning structure between parts of different materials according to the present invention is applied to the assembly structure of a motor. In the third embodiment, the present invention is applied to an assembly structure of a mold pinion and a hollow shaft.

First Embodiment

FIGS. 1, 2A, 2B, 3A and 3B show a construction of a motor to which the motor assembly structure as the first embodiment according to the positioning structure between parts of different materials of the present invention is applied, FIG. 1 is a sectional view of the whole motor containing a speed reducer, FIG. 2A is a plan view of the front cover of the motor shown in FIG. 1, FIG. 2B is a plan view of the stator assembly of the motor shown in FIG. 1, FIG. 3A is a sectional view of the front cover of the motor shown in FIG. 1, and FIG. 3B is a sectional view of the stator assembly of the motor shown in FIG. 1.

As shown in FIG. 1, a motor 10 of the first embodiment generally consists of a motor body M and a speed reducer G. The motor body M is provided with a stator 100 and a rotor 200. The stator 100 is provided with a stator assembly 110 and a front cover 120. The stator assembly 110 is constructed by cascading first and second unit stators 111 and 112 that are molded by resin 113. A rotor housing S is formed on the center of the stator assembly 110 and is covered by the front cover 120. Each of the first and second unit stators 111 and 112 consists of a coil 102 wound around an annular bobbin 101 and a pair of claw poles 103 and 104 that sandwich the bobbin 101. The coil 102 is connected to an external connection terminal 106 through a substrate 105.

The rotor 200 is rotatably supported by a fixed shaft 210. One end of the fixed shaft 210 is fixed to a holding portion 130 that is formed on the bottom of the stator assembly 110. The other end of the fixed shaft 210 is fixed in the speed reducer G through a center hole 121 (see FIG. 2A) of the front cover 120. The rotor 200 consists of a core 220, a cylindrical permanent magnet 230 formed around the core 220, and a gear part 240 that projects from the upper surface of the core 220 to the side of the speed reducer G through the front cover 120. The permanent magnet 230 consists of N-poles and S-poles that are alternately arranged in the rotating direction.

On the other hand, the speed reducer G is provided with a gear train 310 that slows down the rotation of the rotor 200 with a predetermined reduction gear ratio and transfers it to an output shaft 320 to rotate the output shaft 320. The gear train 310 is mounted in a resin-made gearbox 330. The gearbox 330 is fixed to the motor body M by engaging an engagement portion 331 shown in the left-hand side in FIG. 1 to a flange 107 of the motor body M.

In the first embodiment, the front cover 120 corresponds to the first part that is made of metal (for example, iron) and the stator assembly 110 corresponds to the second part whose contact surface portion is made of resin. The front covers 120 and the stator assembly 110 are positioned by contacting their surfaces.

Next, the positioning structure that is a characterizing portion of the first embodiment will be described. In the first embodiment, the metal-made front cover 120 and the resin portion of the stator assembly 110, which are different in degree of modification due to environmental variation, are positioned. A reference point is set at the rotation center of the rotor 200. The reference point is defined as a point where the relative position between the first and second parts does not change even if environment varies. As shown in FIGS. 2A and 3A, four oblong projections 122 are formed on the contact surface of the front cover 120 at equal angular intervals along a circle whose center is coincident with the reference point.

On the other hand, grooves 114 are formed on the contact surface of the stator assembly 110 at four areas so that the respective projections 122 are fitted therein as shown in FIGS. 2B and 3B. Wall surfaces 114a and 114b to which the projections 122 can contact at the outer and inner sides of the projections 122 when viewed from the rotation center as the reference point are formed in each of the grooves 114. The width of the grooves 114 is determined so that the projections 122 contact the outer or inner wall surface 114a or 114b of the grooves 114 even when the front cover 120 and the stator assembly 110 deform in different degrees due to environmental variation. As shown in FIG. 1, the front cover 120 and the stator assembly 110 are positioned by contacting the surfaces thereof while fitting the projections 122 into the grooves 114.

The operation of the positioning structure of the first embodiment will be described with reference to FIGS. 4A, 4B, 5A and 5B. FIGS. 4A and 4B are plan views showing the relationship between the projections 122 of the front cover 120 and the grooves 114 of the stator assembly 110, FIGS. 5A and 5B are sectional views thereof.

According to the first embodiment, when the motor 10 is assembled at a normal temperature, the projections 122 contact the inner wall surface 114a and the outer wall surface 114b of the grooves 144 as shown in FIGS. 4A and 5A. Therefore, the front cover 120 and the stator assembly 110 are positioned with each other so that the centers of the front cover 120 and the stator assembly 110 are coincident with the reference point.

Since expansion of the resin part of stator assembly 110 is larger than that of the metal front cover 120, an increase in temperature expands the inner wall surface 114a and the outer wall surface 114b with respect to the rotation center. As a result, as shown in FIGS. 4B and 5B, the projections 122 contact the inner wall surfaces 114a so that the front cover 120 and the stator assembly 110 are positioned so that the centers thereof are coincident with the reference point. Therefore, since the motor 10 of the first embodiment is able to prevent the decentering of the front cover 120, the rotation of the rotor 200 is not stopped by the decentering as in the prior art. The motor 10 of the first embodiment has high reliability even in a place with large environmental variation. Thus, the first embodiment uses the characteristics that the variations of the diameter of the inner circle and the diameter of the outer circle of the groove 114 are proportional to the deformation of the resin due to the change of the temperature (or humidity).

In the first embodiment, the four projections are formed along the circle whose center is coincident with the reference point and the grooves are formed at the four areas. However, the number and shape of the projections, the number and shape of the grooves are not limited to the above described embodiment. Many variations are available. FIGS. 6A through 6H show such variations FIG. 6A shows an example where four oblong projections T are formed and a groove M is formed along the whole circle, FIG. 6B shows an example where four circular projections T are formed and a groove M is formed along the whole circle, FIG. 6C shows an example where four circular projections T are formed and grooves M are formed at four areas, FIG. 6D shows an example where four oblong projections T are formed and grooves M are formed at four areas, FIG. 6E shows an example where three oblong projections T are formed and a groove M is formed along the whole circle, FIG. 6F shows an example where three oblong projections T are formed and grooves M are formed at three areas, FIG. 6G shows an example where six circular projections T are formed and grooves M are formed at six areas, FIG. 6H shows an example where six oblong projections Tare formed and grooves M are formed at six areas.

A part deforms due to not only temperature variation but also humidity variation or external force. In either case, the positioning structure of the first embodiment is effective to prevent the displacement of the parts at the reference point and to prevent the decentering of the rotor.

Second Embodiment

FIGS. 7A through 7C are sectional views showing the motor assembly structure according to the second embodiment of the positioning structure between parts of different materials of the present invention. FIG. 7A shows a stator assembly, FIG. 7B shows a casing, and FIG. 7C shows an assembling structure of the both parts.

A stator assembly 310 is constructed by cascading two unit stators 311 and 312 as with the first embodiment. Resin-made projections 313 are formed at the bottom of the lower unit stator 312. On the other hand, a cup-shaped casing 320 is made of metal and a groove (or a through hole) 321 to which the projections 313 are fitted are formed on a bottom wall. Three or more projections 313 are formed on a circle whose center is coincident with the rotation center as the reference point. The grooves 321 are formed corresponding to the projections 313.

According to the second embodiment, even if the positions of the projections 313 of the stator assembly 310 vary with respect to the grooves 321 of the casing 320 due to the environmental variation, the projections 313 contact at least one of the inner and outer wall surfaces of the grooves 321, which can keep the positional relationship between the stator assembly 310 and the casing 320 at the rotation center.

FIGS. 8A and 8B are sectional views showing variations of the positioning structure between parts of different materials of a present invention, respectively. In an example of FIG. 8A, projections 411 are formed on a metal-made part 410 and a groove 421 is formed on a resin-made part 420. In an example of FIG. 8B, projections 511 are formed on a resin-made part 510 and a groove 521 is formed on a metal-made part 520. As described above, when a resin-made part and a metal-made part are combined, it is easy to form projections on the resin-made part and to form a groove on the metal-made part in view of manufacturing. However, the reverse combination is also available.

Third Embodiment

FIG. 9 is a sectional view showing the assembly structure of a mold pinion and a hollow shaft according to a third embodiment of the positioning structure between parts of different materials of the present invention. The mold pinion 610 is made of resin. A gear 611 is formed at the tip of the mold pinion 610 and a groove 612 is formed on the base portion around the whole circle. The hollow pipe 620 is formed as a cylinder and the tip thereof has a function of a projection 621. Thickness of the tip portion may be thinner than the other portion.

In the example of FIG. 9, the reference point is coincident with the rotation centers of the mold pinion 610 and the hollow pipe 620. When the projection 621 is inserted into the groove 612 of the pinion 610 at a normal temperature, the projection 621 contacts the inner and outer wall surfaces of the groove 621, and thereby, the both parts are fixed. When the temperature Increases, the resin-made pinion 610 is expanded with the predetermined expansion ration that is larger than that of the hollow pipe 620, which enlarges the inner and outer wall surfaces of the groove 621. Although a gap is generated between the outer wall surface of the groove 612 and the projection 621, the inner wall surface of the groove 612 contacts the projection 621. Therefore, the decentering between the pinion 610 and the hollow pipe 620 can be prevented.

The positioning structure between parts of different materials of the present invention are widely applicable to positioning of the parts formed with the materials whose coefficients of thermal expansion are different to each other as well as the motor assembly and the gear assembly described in the embodiments.

What is claimed is:

1. A positioning structure between parts of different materials that positions a first part formed of a first material to a second part formed of a second material, which is different from said first material in degree of modification due to environmental variation, by contacting surfaces of said first and second parts, comprising:
at least three solid projections that are disposed on the contact surface of said first part at nearly equal angular intervals along a circle whose center is coincident with a reference point, which reference point is defined as a point where the relative position between said first and second parts does not change even if environment varies, said projections being projected in a direction substantially perpendicular to a plane including said circle; and
grooves that are disposed on the contact surface of said second part so that the respective projections are fitted therein and that have wall surfaces to which said projections can contact at the inner and outer sides of said projections when viewed from said reference point,
wherein the width of said grooves in a radial direction of said circle is determined so that said projections contact the inner or outer wall surface of said grooves even when said first and second parts expand or contract in size in different degrees due to environmental variation,
wherein said first and second parts are positioned by contacting the surfaces thereof while fitting said projections into said grooves,
wherein each of said projections has a predetermined width in the radial direction so that the projections contact the inner wall surface and the outer wall surface of said grooves when assembling at a normal temperature,
wherein the environmental variation includes temperature variation or humidity variation.

2. The positioning structure between parts of different materials according to claim 1, wherein said first material is metal and that said second material is resin.

3. The positioning structure between parts of different materials according to claim 1 or 2, wherein said first part is a cover member for supporting a rotation shaft of a motor and that said second part is a stator assembly that constitutes a stator of the motor.

4. An assembly structure of a motor that positions a cover member for supporting a rotation shaft of the motor to a stator assembly that constitutes a stator of the motor, by contacting surfaces thereof, comprising:
at least three solid projections that are disposed on the contact surface of said cover member, which is made of metal, at nearly equal angular intervals along a circle whose center is coincident with a reference point that is defined as the center of said rotation shaft, said projections being projected in a direction substantially perpendicular to a plane including said circle; and
grooves that are disposed on said contact surface, which is made of resin, of said stator assembly so that said respective projections are fitted therein and that have wall surfaces to which said projections can contact at the inner and outer sides of said projections when viewed from said reference point,
wherein the width of said grooves in a radial direction of said circle is determined so that said projections contact the inner or outer wall surface of said grooves even when said cover member and said stator assembly expand or contract in size in different degrees due to environmental variation,
wherein said cover member and said stator assembly are positioned by contacting the surfaces thereof while fitting said projections into said grooves,
wherein each of said projections has a predetermined width in the radial direction so that the projections contact the inner wall surface and the outer wall surface of said grooves when assembling at a normal temperature, and
wherein the environmental variation includes temperature variation or humidity variation.

5. A positioning structure between parts of different materials that positions a first part formed of a first material to a second part formed of a second material, which is different from said first material in degree of modification due to environmental variation, by inserting said second part into said first part, comprising:
a cylindrical projection that is formed on said first part along a circle whose center is coincident with a reference point, which is defined as a point where the relative position between said first and second parts does not change even if environment varies, and a groove that is formed on said second part so that said projection is fitted therein and that has wall surfaces to which said projection can contact at the inner and outer sides of said groove when viewed from said reference point,
wherein the width of said groove is determined so that said projection contact the inner or outer wall surface of said grooves even when said first and second parts deform in different degrees due to environmental variation, and
wherein said first and second parts are positioned while fitting said projection into said groove.

6. The positioning structure between parts of different materials according to claim 5, wherein said first part is a metal-made hollow pipe and said second part is a resin-made gear, and wherein the tip of said hollow pipe is inserted into said groove formed on said gear to position to each other.

* * * * *